(12) United States Patent
Jenny et al.

(10) Patent No.: US 8,840,135 B2
(45) Date of Patent: Sep. 23, 2014

(54) AIRBAG DEVICE FOR A VEHICLE, METHOD FOR TRANSFERRING AN AIRBAG OF THE AIRBAG DEVICE INTO A COMPACT STATE, AND VEHICLE WITH THE AIRBAG DEVICE

(75) Inventors: Thomas Jenny, Alsbach-Haehnlei (DE); Ulrich Rick, Braunweiler (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/618,677

(22) Filed: Sep. 14, 2012

(65) Prior Publication Data

US 2013/0069347 A1    Mar. 21, 2013

(30) Foreign Application Priority Data

Sep. 21, 2011    (DE) .......................... 10 2011 113 922

(51) Int. Cl.
| | |
|---|---|
| *B60R 21/20* | (2011.01) |
| *B60R 21/231* | (2011.01) |
| *B60R 21/2346* | (2011.01) |
| *B60R 21/237* | (2006.01) |
| *B60R 21/261* | (2011.01) |

(52) U.S. Cl.
CPC ........... *B60R 21/2346* (2013.01); *B60R 21/261* (2013.01); *B60R 21/231* (2013.01); *B60R 21/20* (2013.01); *B60R 21/237* (2013.01); *B60R 21/23138* (2013.01)
USPC .................. 280/730.2; 280/730.1; 280/743.1; 280/743.2

(58) Field of Classification Search
USPC ....................... 280/730.1, 730.2, 743.1, 743.2
See application file for complete search history.

(56) References Cited

U.S. PATENT DOCUMENTS

| | | | |
|---|---|---|---|
| 5,112,079 A | 5/1992 | Haland et al. | |
| 5,927,750 A | 7/1999 | Nakamura et al. | |
| 6,065,772 A | 5/2000 | Yamamoto et al. | |
| 6,371,518 B1 * | 4/2002 | Kalandek et al. | .......... 280/743.1 |
| 7,347,444 B2 * | 3/2008 | Wheelwright | ............. 280/729 |
| 7,594,677 B2 | 9/2009 | Sendelbach et al. | |
| 7,798,523 B2 * | 9/2010 | Shigemura | ................ 280/730.2 |
| 7,828,326 B2 * | 11/2010 | Arez et al. | .................... 280/739 |

(Continued)

FOREIGN PATENT DOCUMENTS

| | | |
|---|---|---|
| AT | 6034 U1 | 3/2003 |
| CN | 101927748 A | 12/2010 |

(Continued)

*Primary Examiner* — Paul N Dickson
*Assistant Examiner* — Darlene P Condra
(74) *Attorney, Agent, or Firm* — Ingrassia Fisher & Lorenz, P.C.

(57) ABSTRACT

An airbag device for a vehicle, a method for transferring an airbag of the airbag device into a compact state, and a vehicle with the airbag device are provided. The airbag device includes an airbag that, on an activation of the airbag device, is configured from a compact state into an expanded state. The airbag has a head region, a thorax region, and a pelvis region. In the expanded state of the airbag, the head region is configured for protection of a head of an occupant situated on a vehicle seat, the thorax region is configured for protection of an upper body of the occupant, and the pelvis region is configured for protection of a pelvis of the occupant. The airbag is configured as a single-chamber side airbag. The airbag device further comprises a gas generator for generation of gas.

15 Claims, 6 Drawing Sheets

(56) References Cited

U.S. PATENT DOCUMENTS

| | | |
|---|---|---|
| 8,136,837 B2 | 3/2012 | Feller |
| 8,246,076 B2 | 8/2012 | Schmidt et al. |
| 2006/0131845 A1 | 6/2006 | Belwafa |
| 2009/0020991 A1* | 1/2009 | Abe et al. .............. 280/739 |
| 2010/0001500 A1* | 1/2010 | Feller .................. 280/743.1 |
| 2010/0171291 A1* | 7/2010 | Schmidt et al. ........ 280/730.2 |
| 2011/0074136 A1* | 3/2011 | Honda et al. ........... 280/728.3 |
| 2012/0091695 A1 | 4/2012 | Olivier et al. |

FOREIGN PATENT DOCUMENTS

| | | |
|---|---|---|
| DE | 19529829 C1 | 10/1996 |
| DE | 102004031865 A1 | 2/2006 |
| DE | 102008048398 A1 | 2/2009 |
| DE | 102009031615 A1 | 1/2011 |
| EP | 0847902 A1 | 6/1998 |
| EP | 0963879 A2 | 12/1999 |
| GB | 2318767 A | 5/1998 |
| WO | 2006133739 A1 | 12/2006 |
| WO | 2010125133 A2 | 11/2010 |

* cited by examiner

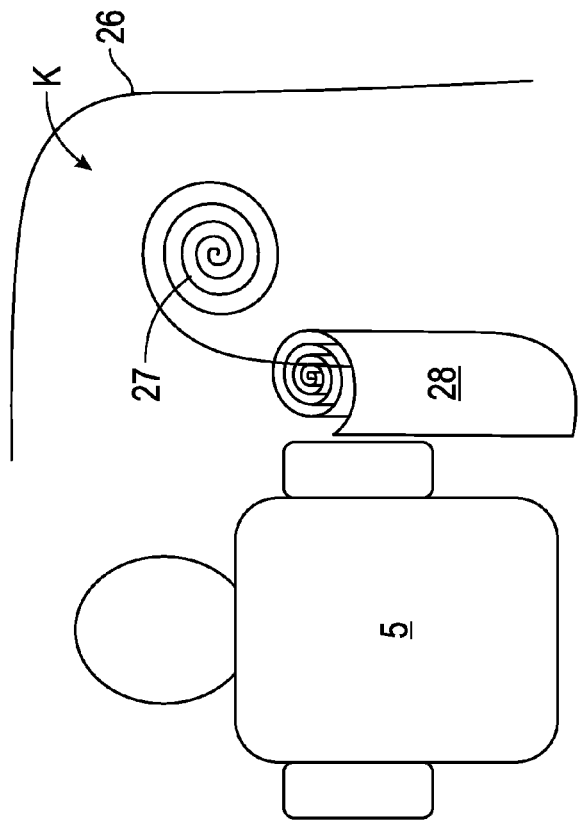
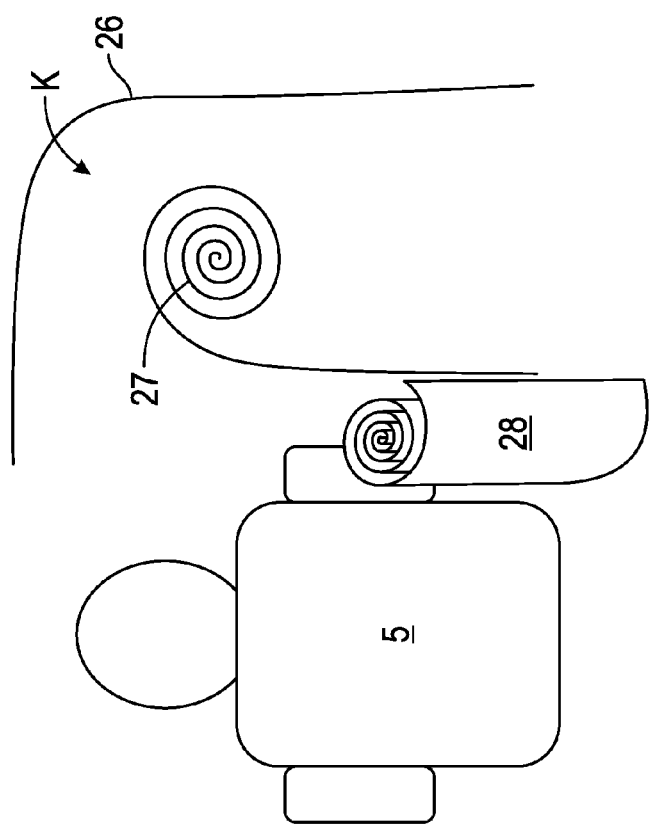

AIRBAG DEVICE FOR A VEHICLE, METHOD FOR TRANSFERRING AN AIRBAG OF THE AIRBAG DEVICE INTO A COMPACT STATE, AND VEHICLE WITH THE AIRBAG DEVICE

CROSS-REFERENCE TO RELATED APPLICATION

This application claims priority to German Patent Application No. 10 2011 113 922.6, filed Sep. 21, 2011, which is incorporated herein by reference in its entirety.

TECHNICAL FIELD

The technical field relates to an airbag device for a vehicle, a method for transferring an airbag of the airbag device into a compact state and a vehicle with the airbag device.

BACKGROUND

Nowadays, airbag devices are integrated in almost every vehicle. Airbag devices comprise at least one airbag which can protect an occupant sitting on a vehicle seat from injuries in the case of an accident. For example, side airbags are known, which protect the head, the upper body and the pelvis of the occupant, in particular in the case of a lateral impact of the vehicle.

For example, the publication WO 2006/133 739 A1 discloses a vehicle seat with a side airbag, which has a plurality of airbag chambers subdivided from one another and is constructed to protect the pelvis, the upper body and the head of the occupant in the case of an impact. The side airbag is integrated in a backrest of the vehicle seat. In the case of an impact of the vehicle, a gas generator which is arranged spaced apart from the airbag, generates gas which is directed through a diffuser device from the gas generator to the airbag and is introduced through a plurality of diffuser openings into the individual airbag chambers.

It is desirable to provide a cost-reducing functional side airbag. Furthermore, other desirable features and characteristics will become apparent from the subsequent detailed description and the appended claims, taken in conjunction with the accompanying drawings and this background.

SUMMARY

An airbag device for a vehicle, in particular an automobile, truck or bus, is provided. The airbag device comprises an airbag for the protection of an occupant sitting on a vehicle seat in the case of an impact, in particular a lateral impact, of the vehicle.

In an exemplary embodiment, the airbag is constructed as an air bag which is to be filled with gas. In particular, it is able to be transferred from a flat state into a compact state, wherein the airbag in the flat state is spread out fully and the inner sides of the airbag lie on one another. In the compact state, the airbag is partially or fully roll-folded, rolled and/or folded, and/or turned (in). Optionally, the airbag is integrated in an airbag housing, which can be constructed as a hard cover, e.g., from a plastic material, or as a soft cover, e.g., from a textile material.

In an embodiment, the airbag is able to be arranged in the compact state in the vehicle seat, for example in or on a backrest of the vehicle seat, in order to be able to develop its protective effect with respect to the occupant in the case of the impact. Alternatively, the airbag can also, for example, be integrated in a vehicle side wall, such as in a vehicle column or vehicle door situated nearest to the occupant.

On and/or after an activation of the airbag device, in particular by the impact of the vehicle, the airbag is transferred from the compact state into an expanded, in particular inflated state. In the expanded state, the airbag is fully unrolled and unfolded and filled with gas, so that the outer sides of the airbag directed towards a vehicle interior are fully taut and the inner sides, lying opposite the outer sides, are arranged spaced apart from one another.

Optionally, the expanded airbag is arranged between the occupant and the vehicle side wall, wherein it extends from below, in the direction of a vehicle floor, upwards, in the direction of a vehicle roof lining. Here, in the expanded state of the airbag, the pelvis region is positioned at the bottom, the thorax region is positioned centrally and the head region is positioned at the top. Thereby, the expanded airbag can absorb in particular an impact of the occupant against the vehicle side wall and protect the occupant from injuries thereby over a large area.

In an embodiment, the airbag comprises a head region which, in the expanded state of the airbag, is constructed to protect an occupant's head. For example, the head region comprises a back-of-head section and a front-of-head section, wherein the back-of-head section is constructed to protect the back of an occupant's head and the front-of-head section is constructed to protect the occupant's face when the airbag is expanded. In an embodiment, the back-of-head section comprises (approximately) one third and the front-of-head section comprises (approximately) two thirds of the volume of the expanded head region.

In an embodiment, the head region is dimensioned so that the head of the occupant is sufficiently protected in all or almost all relevant load cases. In particular, the head region is dimensioned so that the head, on the impact of the vehicle, plunges centrally into the expanded head region.

In another embodiment, the airbag comprises a thorax region and a pelvis region, wherein the thorax region is constructed for the protection of an upper body, in particular a shoulder-, chest and abdominal region of the occupant, and the pelvis region is constructed for the protection of the pelvis of the occupant sitting on the vehicle seat. Optionally in addition, the pelvis region is constructed for the protection of the thighs of the occupant.

In a further embodiment, the airbag device comprises a gas generator, which is constructed for the generation of gas. The gas generator is constructed as a hybrid gas generator that comprises a pressure vessel with the compressed gas and a pyrotechnic assembly. The gas is often formed by nitrogen or by an argon/helium mixture. Alternatively, the gas generator can also be constructed as a purely pyrotechnic gas generator. On and/or after the generation of gas by the gas generator, the air bag is transferred from the compact state into the expanded state.

As contemplated herein, the airbag is constructed as a single-chamber side airbag. In an embodiment, the airbag only has one chamber, by which the head/thorax and pelvis region is formed. In particular, the single-chamber side airbag is constructed as a continuous or as far as possible continuous air bag, in which the head, thorax and pelvis region continue into one another free of transition or as far as possible free of transition. In an embodiment, the head, thorax and pelvis region are not, or as far as possible are not separated from one another or reciprocally divided. In another embodiment, the airbag is constructed so as to be free of division and/or free of region separation.

In an embodiment, the airbag has no membranes or no separating fabric which extends between the inner sides of the airbag, in order to divide the head, thorax and pelvis region.

When the airbag nevertheless has at least one membrane or separating fabric, the latter can extend as a maximum over a third, in particular as a maximum over a quarter, for example as a maximum over a fifth of a width of the region of the flat, unfolded and unrolled airbag, in which the membrane or the separating fabric is incorporated (proceeding from a top view or lateral view of the airbag).

For example, it is entirely possible that the airbag has at least one rebound strap, in particular in the head region, which is constructed to delimit a three-dimensional expansion of the airbag transversely to a direction of travel of the vehicle. In an embodiment, the rebound strap extends in the flat and/or expanded state of the airbag maximally over a third, for example maximally over a quarter, for example maximally over a fifth of the airbag width, such as of a head region width (proceeding from the top view or lateral view of the flat and/or expanded airbag, in particular of the head region or of the region in which the rebound strap is arranged).

It is advantageous that the airbag is easy to manufacture as a single-chamber side airbag, because no membranes or separating fabric have to be incorporated between the inner sides in order to divide the airbag into the head, thorax and pelvis regions. Thereby, costs can be saved in production.

It is also advantageous that owing to its structure and a characteristic roll folding, the airbag can also protect the occupant extensively from injuries in "out of position" cases. In particular, the airbag is constructed to offer sufficient protection to the occupant on the impact under endurable load values, e.g., when sitting and also in other postures on the vehicle seat. Especially, the airbag also ensures a secure positioning relative to the occupant and a 5-star-Euro- or US-NCAP rating under difficult environmental conditions of the vehicle. An "out of position" cutoff of the airbag device can be dispensed with in an advantageous manner.

In another embodiment, the gas generator is arranged inside the airbag, such as in the thorax region. For example, the gas generator generates the gas inside the airbag, in particular between the inner sides of the airbag.

In a further embodiment, the airbag device has a diffuser with at least a first diffuser opening and at least a second diffuser opening. The diffuser is arranged inside the airbag, for example, adjacent to the inner sides of the airbag and/or in the region of the gas generator.

The diffuser is constructed to direct the gas that is generated by the gas generator as a first gas stream through the first diffuser opening in a first flow direction. Furthermore, the diffuser is constructed to direct the gas that is generated by the gas generator as a second gas stream through the second diffuser opening in a second flow direction. Provision is made that the first and second flow directions differ from one another.

In an embodiment, the diffuser is arranged inside the thorax region. Here, the diffuser can surround the gas generator, e.g., partially or completely or can adjoin at outflow openings of the gas generator, so that it can guide the gas which is generated by the gas generator into the first and second flow direction. Optionally, the diffuser is sewn with an outer seam of the airbag, for example, in the thorax region. In an advantageous manner, the integration of the diffuser can ensure a quicker filling and correct positioning of the head region, when the airbag device is activated by the impact.

In another embodiment, the first diffuser opening is directed to the pelvis region and the second diffuser opening to the head region, whereby the first gas stream flows in the first flow direction to the pelvis region and the second gas stream flows in the second flow direction to the head region. For example, the first flow direction is directed downwards, especially to the floor of the vehicle, and the second flow direction is directed upwards, especially to the roof lining of the vehicle.

In another embodiment, the second diffuser opening has a greater opening area, in particular a greater opening cross-section, than the first diffuser opening. Alternatively or optionally, in addition the second gas stream has a greater volume flow than the first gas stream. Therefore, in an advantageous manner, an efficient and reliable expansion of the head region upwards can be ensured.

To assume the compact state of the airbag, in an embodiment, it is assumed that the pelvis region is turned in contrary to the first flow direction. For example, the turned-in pelvis region has a semi-circular outer contour. In particular, the pelvis region is partially or completely turned into the thorax region, so that the outer sides of the turned-in pelvis region contact and/or overlap the inner sides of the thorax region.

In another embodiment, to assume the compact state of the airbag, the back-of-head section is turned in transversely to the second flow direction. In particular, the back-of-head section is turned in partially or completely into or in the direction of the front-of-head section. Especially, the outer sides of the turned-in back-of-head section contact and/or overlap the inner sides of the front-of-head section. Optionally, the turned-in back-of-head section has a triangular outer contour.

It is also entirely possible that to assume the compact state of the airbag, the back-of-head section is folded, flapped or flapped double (flapped in a Z-fold) transversely to the second flow direction. As contemplated, an outer side of the back-of-head section lays on an outer side of the front-of-head section, in particular a second half of the front-of-head section.

Alternatively or optionally in addition, the front-of-head section, for example approximately a first half of the front-of-head section, is turned in transversely to the second flow direction. In particular, the front-of-head section is turned in partially or completely into or in the direction of the back-of-head section. Here, the outer sides of the turned-in first half of the front-of-head section contact the inner sides of the second half of the front-of-head section. For example, the turned-in front-of-head section has a triangular outer contour.

In another embodiment, the front-of-head section is folded, flapped or flapped double (flapped in a Z-fold) transversely to the second flow direction, in order to transfer the airbag into the compact state. For example, the first half of the front-of-head section is partially or completely folded, flapped or flapped double (flapped in a Z-fold) into or in the direction of the back-of-head section. In particular here an outer side of the first half of the front-of-head section contacts the outer side of the second half of the front-of-head section.

It is also possible that the outer side of the first half of the front-of-head section rests at least partially on the outer side of the back-of-head section. Optionally, the flapped-in or folded front-of-head section has a triangular outer contour. When the front-of-head section is folded double or flapped double (flapped in a Z-fold), it can have a rectangular outer contour.

In a further embodiment, both, in particular the back-of-head section and the front-of-head section, are folded-in, folded, flapped or flapped double (flapped in a Z-fold) transversely to the second flow direction and directed towards one another.

In yet a further embodiment, to assume the compact state of the airbag, the front-of-head section is turned in together with the back-of-head section contrary to the second flow direction, whereby a turned-in head region is formed. Optionally, to form the turned-in head region, firstly only the back-of-head section or firstly only the front-of-head section is turned in, folded, flapped or flapped double (flapped in a Z-fold) transversely to the second flow direction, before the two are turned in together contrary to the second flow direction.

In accordance with an exemplary embodiment, to form the turned-in head region, both, in particular the back-of-head section and the front-of-head section are turned in, folded, flapped or flapped double (flapped in a Z-fold) transversely to the second flow direction and directed towards one another, before the two are turned in together contrary to the second flow direction.

In an embodiment, the turned-in head region is turned in up to a transition between the head- and thorax region of the airbag. Optionally, the turned-in head region can also be turned in at least partially into the thorax region, especially up to the upper end of the gas generator. Preferably here the outer sides of the head region contact the inner sides of the thorax region and/or overlap therewith. It is possible that the head region is turned in singly or several times, in order for example to achieve a cascade unfolding on and/or after the activation of the airbag device.

In the following description of the airbag, it is assumed that the airbag is positioned between the vehicle side wall and the occupant situated on the vehicle seat, wherein the flat, non-expanded, optionally partially turned-in airbag extends from the top downwards parallel or substantially parallel to the vehicle side wall.

In one embodiment, in the compact state the airbag has a single roll. Here, the turned-in head region together with the turned-in pelvis region and the thorax region can be rolled up to the single roll. In particular, the turned-in head region together with the turned-in pelvis region and the thorax region is rolled up towards the occupant and/or contrary to the direction of travel of the vehicle to the single roll.

In another embodiment, a roll package formed by the single roll lies against the occupant. For example, an opening of the roll package of the single roll is directed to the side wall of the vehicle and/or arranged facing away from the occupant. In an embodiment, the single roll is constructed to unroll against the occupant on and/or after the activation of the airbag device, when the airbag is expanded.

It is also possible that the single roll is rolled up to the occupant and/or contrary to the direction of travel of the vehicle, so that the opening of the roll package of the single roll is directed to the occupant and the roll package lies against the side wall of the vehicle. In particular, the single roll unrolls on the side wall of the vehicle when the airbag expands.

In an alternative embodiment, the airbag has, in the compact state, an upper and a lower roll. Preferably, the turned-in pelvis region together with the thorax region is rolled up towards the occupant and/or contrary to the direction of travel of the vehicle, wherein it forms the lower roll. In particular, the roll package of the lower roll lies against the occupant, wherein the opening of the roll package is directed towards the vehicle side wall. Thereby, the lower roll unrolls against the occupant, when the airbag expands.

The lower roll can alternatively also be rolled up to the occupant and/or contrary to the direction of travel of the vehicle so that the opening of the roll package of the lower roll is directed towards the occupant and the roll package lies against the side wall of the vehicle. In particular, the lower roll then unrolls against the side wall of the vehicle, when the airbag expands.

In an embodiment, the turned-in, folded, flapped or double flapped (flapped in a Z-fold) back-of-head region together with the non-turned or flapped front-of-head region is rolled up towards the side wall of the vehicle and forms the upper roll.

Alternatively, the turned-in, folded, flapped or double flapped (flapped in a Z-fold) front-of-head region together with the non-turned or flapped back-of-head region is rolled up towards the side wall of the vehicle and forms the upper roll.

In another embodiment, the two together, in particular the turned-in, folded, flapped or double flapped (flapped in a Z-fold) back-of-head region and the turned-in, folded, flapped or double flapped (flapped in a Z-fold) front-of-head region are rolled up towards the side wall of the vehicle and form the upper roll.

In a further embodiment, the upper roll has a roll fold facing away from the occupant. In particular, the roll package of the upper roll lies against the side wall of the vehicle and the opening of the roll package is directed downward, in the direction of the floor of the vehicle. Thereby, the upper roll preferably rolls upwards against the occupant, in particular along the head of the occupant, when the airbag expands.

In yet a further embodiment, in the compact state of the airbag the upper roll is rolled over by the lower roll. In particular on rolling up the lower roll, the upper roll is also rolled up, so that the latter is not visible from the exterior.

In an exemplary embodiment, the lower roll and thereafter the upper roll unroll against the occupant, when the airbag expands. It is also conceivable that the upper and/or the lower roll are rolled up so that in succession, in particular firstly the lower roll and thereafter the upper roll, they unroll against the side wall of the vehicle when the airbag expands.

In a possible structural embodiment herein, the airbag has a rebound strap which is arranged centrally in the head region and extends transversely to the second direction of flow. The second gas stream, after striking onto the rebound strap, is deflected transversely to the second flow direction. In particular, the rebound strap is constructed as a sail, to divert the second gas stream into the back-of-head section and/or into the front-of-head section, so that the head region expands more quickly, in particular obliquely forward at the top, and is correctly positioned in the vehicle. Owing to the rebound strap and, optionally in addition or alternatively owing to the turning, folding, rolling or roll-folding, it can be achieved in an advantageous manner that the airbag expands efficiently obliquely upwards in the direction of the roof of the vehicle, in order to position itself in the direction of travel in front of a belt arranged on the side wall of the vehicle and optionally behind a shoulder of the occupant.

In an embodiment, the airbag has a belt cutout region that is arranged between the head region and the thorax region. Preferably, the belt cutout region is constructed to reduce a belt interaction with the back-of-head section. Alternatively or optionally in addition, the airbag has a shoulder cutout region, which is arranged between the head region and the thorax region.

In another embodiment, the airbag has at least a first and optionally in addition a second gas outlet opening, through which the gas can escape on/after the expanding of the airbag. Preferably, the first gas outlet opening is arranged in the thorax region, e.g., at the height of the gas generator or opposite to the gas generator. For example, the second gas outlet opening is arranged in the back-of-head section.

According to another embodiment, a method for transferring the airbag of the airbag device into the compact state is provided. The airbag device is constructed as described above. Within the scope of the method, the pelvis region is turned in contrary to the first flow direction and together with the thorax region is rolled up towards the occupant and/or contrary to the direction of travel of the vehicle. Within the scope of this method, the single roll or the lower roll can be formed.

When the lower roll is formed, its roll package lies against the occupant. In particular, the opening of the roll package of the lower roll is directed towards the side wall of the vehicle, whereby the lower roll is unrolled against the occupant, when the airbag expands. The opening of the roll package of the single roll is optionally directed towards the occupant or towards the side wall of the vehicle, whereby the roll package is unrolled against the side wall of the vehicle or against the occupant, when the airbag expands.

Within the scope of the method, optionally firstly the back-of-head section and/or the front-of-head section is turned in, folded, flapped and/or flapped in a Z-fold transversely to the second flow direction, and thereafter is rolled up to the upper roll contrary to the second flow direction. The roll package of the upper roll lies against the vehicle side wall, wherein its opening is directed downwards to the floor of the vehicle. Therefore, the upper roll is unrolled against the occupant when the airbag expands.

In an embodiment, firstly the upper roll and thereafter the lower roll are rolled up. In particular, the upper roll, on rolling up the lower roll, is rolled over by the lower roll.

Alternatively, within the scope of the method contemplated herein, firstly the back-of-head section and/or the front-of-head section is turned in, folded, flapped and/or flapped in a Z-fold transversely to the second flow direction, and then turned in contrary to the second flow direction, in particular into the thorax region or up to a transition between the head region and the thorax region. In an embodiment, the turned-in head region that has thereby been produced is then rolled up towards the occupant together with the turned-in pelvis region and the thorax region, to the single roll. Here, the roll package of the single roll preferably lies against the occupant, and the opening of the roll packet is directed towards the side wall of the vehicle. When the airbag expands, the single roll is thereby preferably unrolled against the occupant.

BRIEF DESCRIPTION OF THE DRAWINGS

The various embodiments will hereinafter be described in conjunction with the following drawing figures, wherein like numerals denote like elements, and wherein:

FIG. 3b is an alternative compact state to that of FIG. 3a;

FIG. 5a is a diagrammatic top view onto the compact state of the airbag of FIG. 4;

FIG. 5b is an alternative to the compact state of the airbag of FIG. 5a; and

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
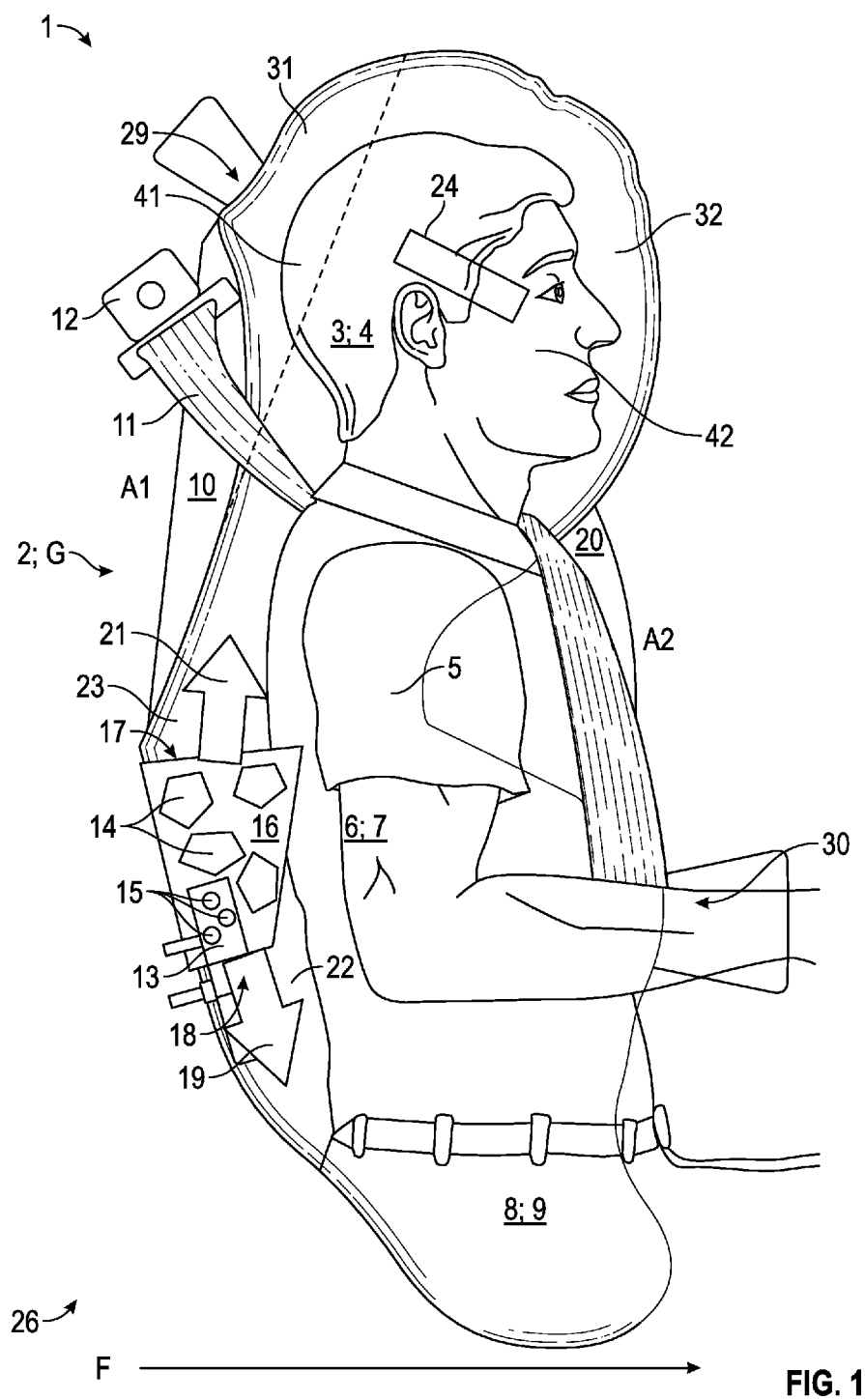
FIG. 1 is a two-dimensional side view of an airbag device with a single-chamber side airbag in the flat state in accordance with an exemplary embodiment.

FIG. 1 shows a side view of a two-dimensional airbag device 1 for a vehicle, in particular for an automobile, truck or bus. The airbag device 1 has an airbag 2 that is illustrated in a flat, for example unturned, unfolded and/or unrolled, in particular not expanded, state F.

The airbag 2 is arranged between a vehicle side wall 26, e.g., in a vehicle column or vehicle door, and an occupant 5 sitting on a vehicle seat, which is not illustrated, wherein the airbag 2 extends parallel or almost parallel to the vehicle side wall 26.

In an exemplary embodiment, the airbag 2 comprises a head region 3 for the protection of the head 4 of the occupant 5 sitting on the vehicle seat in the case of a lateral impact of the vehicle.

The head region 3 comprises a back-of-head section 31 for the protection of the back of the head 41 of the occupant 5 and a front-of-head section 32 for the protection of the face 52 of the occupant 5. The back-of-head section 31 forms approximately one third of the volume of the head region 3, the front-of-head section forms approximately two thirds of the volume of the head region 3.

Furthermore, the airbag 2 comprises a thorax region 6 for the protection of the upper body 7, in particular the chest and abdominal region, and a pelvis region 8 for protection of the pelvis 9 of the occupant 5.

In an embodiment, the airbag 2 has a belt cutout region 10, which extends in a curved manner at the rear region of the airbag 2 between the head- and thorax region 3; 6. Through the belt cutout region 10, free space is created for a vehicle belt 11 and its fastening element 12 on the side wall of the vehicle. Therefore, an interaction between the belt and the airbag 2 can be avoided as far as possible.

The airbag 2 has a shoulder cutout 20, by which a shoulder of the occupant 5 remains free when the airbag 2 is expanded.

In an alternative embodiment, the belt cutout region 10 and/or the shoulder cutout 20 is omitted. Then the airbag 2 has an outer contour in the belt- and/or shoulder region 10; 20 in accordance with the illustrated alternative lines A1 and A2.

In an embodiment, the airbag 2 is constructed as a single-chamber side airbag. As a single-chamber side airbag, the airbag 2 has no regional separations at all by membranes or separating fabric, by which the head, thorax and pelvis regions are divided or separated from one another. It is constructed as an uninterrupted air bag in which gas 14, generated by a gas generator 13, can spread out free of obstruction into the head, thorax and pelvis region 3; 6; 8.

In another embodiment, the airbag 2 has the gas generator 13, which is arranged inside the airbag 2, in particular in the thorax region 6 on a rear side directed contrary to a direction of travel F of the vehicle. The gas generator 13 is constructed to generate the gas 14 on and/or after an activation of the airbag device 1 by an impact, e.g., a lateral impact, of the vehicle and to introduce it through gas outlets 15 into the airbag 2, whereby the latter is expanded.

The gas outlets 15 of the gas generator 13 are arranged, for example, in a diffuser 16, which, like the gas generator 13, is also arranged inside the airbag 2. The diffuser 16 has an upper diffuser opening 17 directed towards the head 4 of the occupant 5, and a lower diffuser opening 18 directed towards the pelvis 9 of the occupant 5.

The gas 14 which is generated by the gas generator 13 is directed as a first gas stream 19 through the lower diffuser opening 18 in a first flow direction 22, to the pelvis region 8, and as a second gas stream 21 through the upper diffusor opening 17 in a second flow direction 23 to the head region 3 of the airbag 2.

In an embodiment, the upper diffuser opening 17 is constructed to be greater than the lower diffuser opening 18, and in this regard, the second gas stream 21 has a greater volume flow than the first gas stream 19. Therefore, the head region 3 can be expanded quickly and reliably by the second gas stream 21.

The airbag 2 comprises a rebound strap 24, which is arranged centrally in the head region 3 of the airbag 2. The rebound strap 24 is constructed as a sail arranged transversely to the second gas stream 21, by which the second gas stream 21 is diverted into the back-of-head section and/or the front-of-head section 31; 32, so that it is positioned quickly and reliably in the direction of travel F obliquely forward and can effectively achieve its full volume there.

The airbag 2 has two gas outflow openings 29; 30, through which the gas 14 can escape into the interior of the vehicle in the expanded state of the airbag 2. The first of the gas outflow openings is arranged at the back-of-head section 31, the second at the front thorax region 6.

Figure 2:
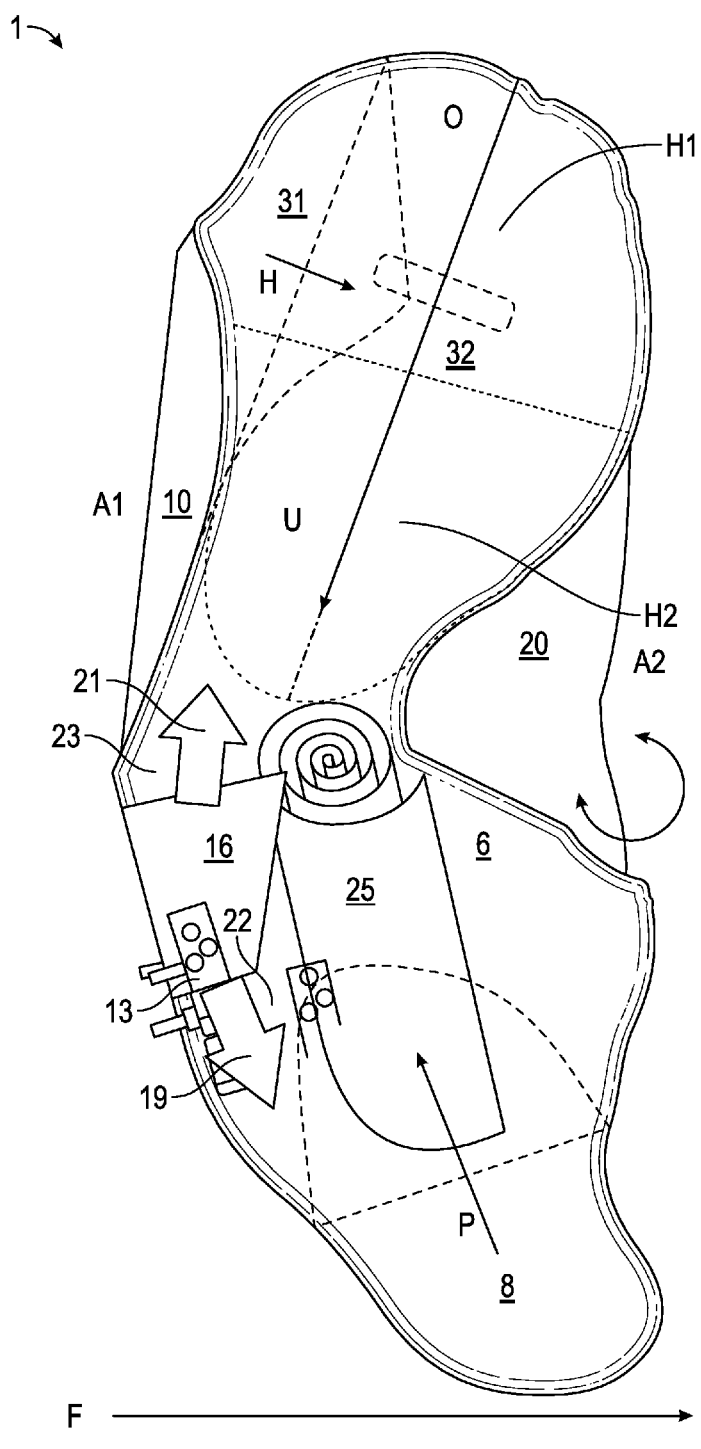
FIG. 2 is the single-chamber side airbag of FIG. 1 in a flat state with turning- and rolling parameters for transferring into a compact state.

FIG. 2 shows the airbag 2 in a two-dimensional top view onto the flat state F, not filled with gas. For integration into the vehicle, regions of the airbag 2 are turned in and rolled up, in order to transfer the airbag 2 into a compact state K.

Figure 3B:
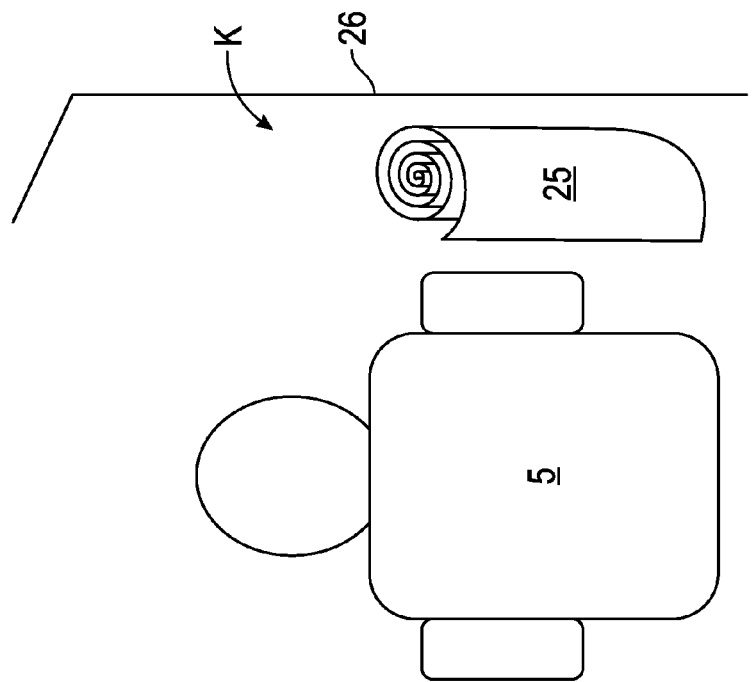
Figure 3A:
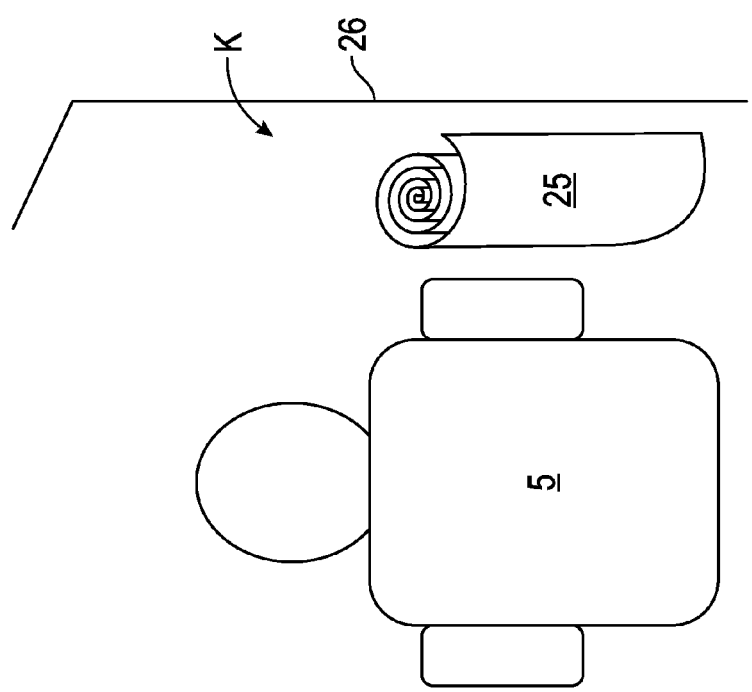
FIG. 3a is a diagrammatic top view onto the compact state of the airbag of FIG. 2.

The compact state K of the airbag 2 is illustrated in FIG. 3a. In the compact state K, the airbag 2 is suited and/or constructed, optionally surrounded by a covering or a housing, to be integrated in a backrest of the vehicle seat or in the side wall 26. On and/or after the activation of the airbag module 1, the gas generator 13 generates the gas 14, by which the airbag 2 unfolds into the interior of the vehicle and, in so doing, is transferred into the expanded state.

In FIG. 2, turning and rolling parameters are drawn, which show how the flat airbag 2 is able to be transferred into the compact state K.

Firstly, the pelvis region 8 is turned in, in accordance with arrow P, contrary to the first flow direction 19 into the thorax region 6, in particular to shortly beneath the gas generator 13, so that an outer side of the pelvis region 8 contacts an inner side of the thorax region 6.

The back-of-head section 31 is then turned in completely, in accordance with arrow H, transversely to the second flow direction 23 into the front-of-head section 32, so that the outer side of the back-of-head section 31 lies against an inner side of the front-of-head section 32.

In an alternative example embodiment, also firstly the back-of-head section 31 and subsequently the pelvis region 8 can be turned in, as described.

After the back-of-head section 31 is turned into the front-of-head section 32, the front-of-head section 32 together with the turned-in back-of-head section 31 is turned in contrary to the second flow direction 23 approximately up to a boundary between the head- and thorax region 3; 6. Therefore, the front-of-head section 32 in top view onto the flat airbag 2 is approximately halved in its area into an upper partial section O and a lower partial section U. The outer side of the upper partial section O now lies against the inner side of the lower partial section U. The turned-in back-of-head section 31 and the turned-in front-of-head section 32 now form together a turned-in head region 3. Optionally, an upper boundary of the turned-in head region 3 can be arranged shortly above the gas generator 13, in order to obtain a compact remaining package.

Thereupon, the flat airbag 2 remaining in the top view, which is now composed of the thorax region 6 and the lower partial section U of the front-of-head section 32, is rolled up towards the occupant 5 (see in this respect FIG. 5a) contrary to the direction of travel F, so that a single roll 25 is formed.

By the rolling up of the single roll 25, a roll package of the single roll 25 is formed, the opening of which is directed according to FIG. 3a to the vehicle side wall 26. Thereby, the single roll 25 unrolls through the gas stream 19; 21 on the occupant 5 and the airbag 2 expands.

In an alternative embodiment, the remaining flat airbag 2 in top view can be rolled up towards the vehicle side wall 26 contrary to the direction of travel F, so that the opening of the roll package of the single roll 25, as shown in FIG. 3b, is directed towards the occupant 5. Thereby, the individual roll 25 unrolls through the first and second gas stream (19; 21) on the vehicle side wall 26 and the airbag 2 expands.

Figure 4:
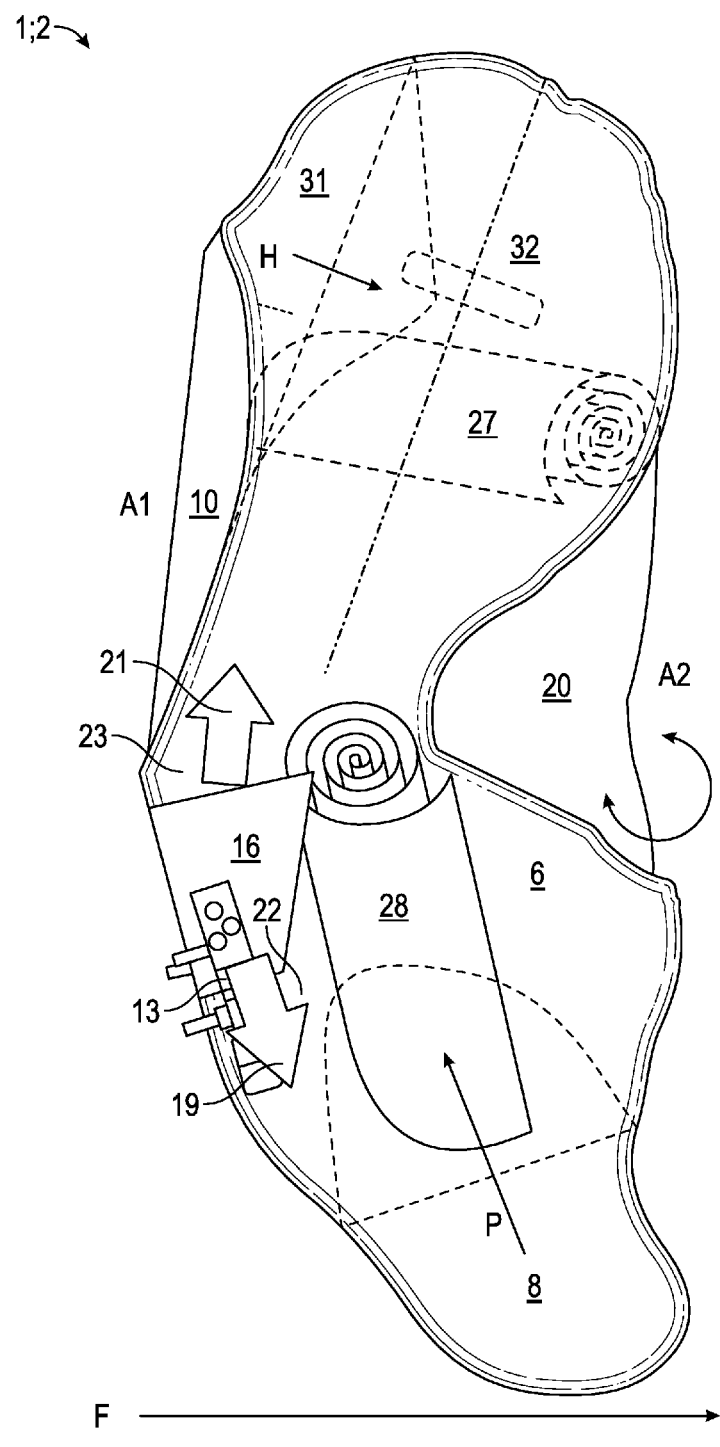
FIG. 4 is a modification of the turning- and rolling parameters of the single-chamber side airbag of FIG. 2.

FIG. 4 shows the airbag 2 likewise in top view onto the flat state not filled with gas. Alternative turning- and rolling parameters to those of FIG. 2 are shown, by which the flat airbag 2 is able to be transferred into the compact state. The compact state, which is produced by the implementation according to the alternative turning- and rolling parameters, is shown in FIG. 5a.

As already described for FIG. 2, firstly the pelvis region 8 is turned in according to arrow P contrary to the first flow direction 19 into the thorax region 6 up to shortly beneath the gas generator 13, so that the outer side of the pelvis region 8 contacts the inner side of the thorax region 6.

Subsequently, the back-of-head section 31 is turned in completely according to arrow H transversely to the second flow direction 23 into the front-of-head section 32, so that the outer side of the back-of-head section 31 lies against the inner side of the front-of-head section 32.

Alternatively, the sequence of turning of the pelvis region 8 and of the back-of-head section 31, as already described with regard to FIG. 2, can be interchanged.

After the turning in of the pelvis region 8 and of the back-of-head section 31, the head region 3 together with the turned-in back-of-head section 31 is rolled up in the direction of travel F and towards the vehicle side wall 26 to an upper roll 27, wherein the roll package of the upper roll 27 is situated on the side facing away from the occupant (see in this respect also FIG. 5a; 5b).

Thereafter, the turned-in pelvis region 8 together with the thorax region 6 and the upper roll 27 is rolled up contrary to the direction of travel F and towards the occupant to a lower roll 28 (see in this respect also FIG. 5a or 5b). Here, the upper roll 27 is rolled over by the lower roll 28, so that the upper roll 27 in the compact state of the airbag 2 is rolled in inside the lower roll 28.

In FIGS. 5a and 5b, the lower roll 28 is shown clearly in black and the upper roll 27 lighter in grey. This gradation in intensity is intended to illustrate that the upper roll 27 is rolled over by the lower roll 28 in the compact state of the airbag 2, so that the upper roll 27 is no longer visible from the exterior.

According to FIG. 5a, the opening of the roll package of the upper roll 27 is directed downwards to the floor of the vehicle. The opening of the roll package of the lower roll 28 is directed to the side wall of the vehicle. Both rolls 27; 28 unroll on and/or after the activation of the airbag device 1 on the occupant 5 when the airbag 2 expands. Through the fact that the upper roll 27 is rolled up in the lower roll 28, firstly the lower roll 28 unrolls and then the upper roll 27.

Alternatively, the lower roll 28 can be rolled up so that the opening of the roll package of the lower roll 27, as shown in FIG. 5b, is directed towards the occupant. Thereby, the lower roll 28 unrolls on and/or after the activation of the airbag device 1 on the vehicle side wall 26. Subsequently, the roll package of the upper roll 27, as described in FIG. 5*a*, is unrolled.

Figure 6:
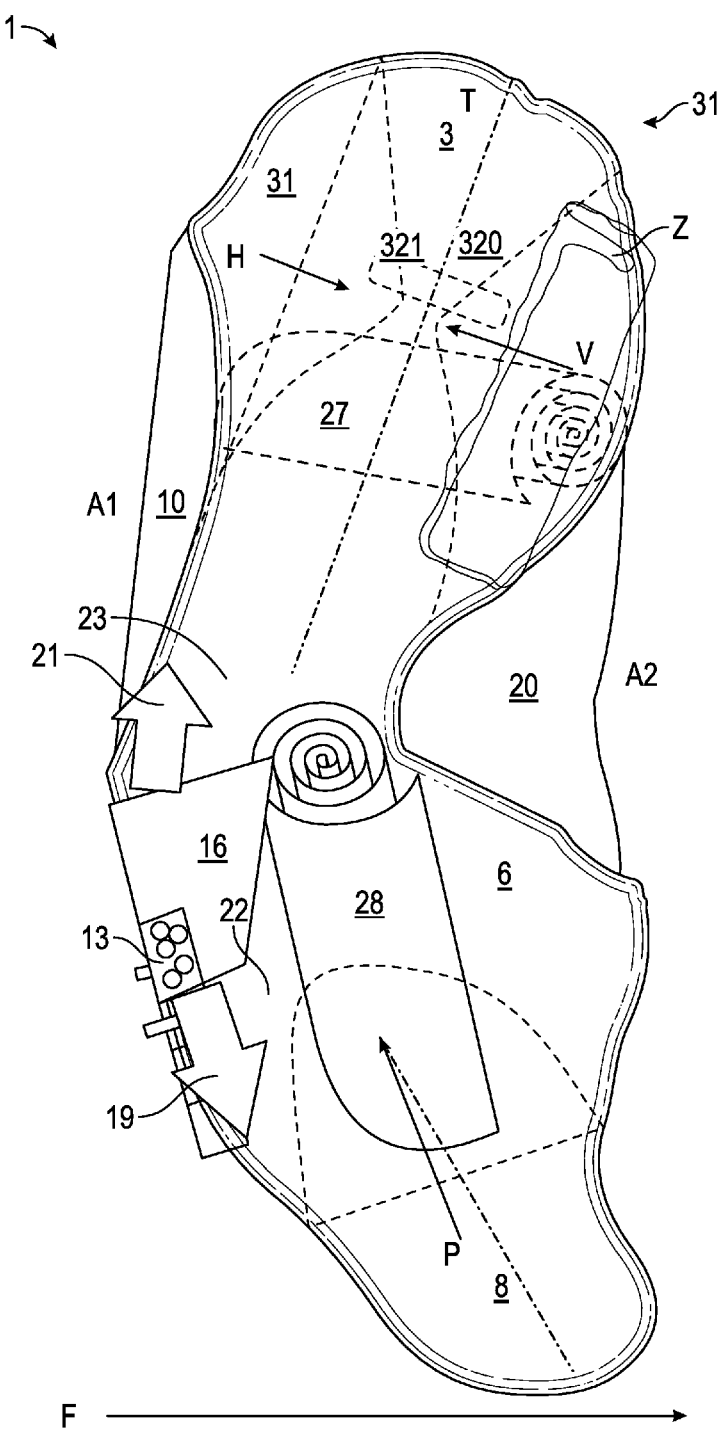
FIG. 6 is the single-chamber side airbag of FIG. 1 or 4 with alternative turning, flapping, folding and/or rolling parameters for transferring into the compact state.

In FIG. 6 the airbag 2 is shown, likewise in top view onto the flat state not filled with gas. Here, modified turning, folding and/or rolling parameters to those shown in FIGS. 2 and 4 are illustrated, by which the flat airbag 2 is able to be transferred into the compact state. The compact state, which occurs through the implementation according to the modified turning, folding and/or rolling parameters, is shown in FIG. 5*a* or 5*b*.

The front-of-head section 32 is divided into a first half 320 and a second half 321, wherein the division U of the first and second half 320; 321 is illustrated by a bold dot-and-dash line running in the second flow direction 23.

Firstly, the pelvis region 8 is turned in according to arrow P contrary to the first flow direction 19 into the thorax region 6, so that the outer side of the pelvis region 8 contacts the inner side of the thorax region 6.

Subsequently, the back-of-head section 31 is flapped or respectively folded completely according to arrow H transversely to the second flow direction 23, so that the outer side of the back-of-head section 31 rests on the outer side of the second half 321 of the front-of-head section 32. Alternatively, the back-of-head section 31 can also be turned in, flapped double or respectively folded in a Z-fold.

Subsequently, the first half 320 of the front-of-head section 32 is flapped or respectively folded according to arrow V transversely to the second flow direction 23, so that the outer side of the front-of-head section 31 rests on the outer side of the front-of-head section 32. Alternatively, the first half 320 can also be turned in, flapped double or respectively folded in a Z-fold. An example Z-fold folding Z is drawn in fine lines in the region of the first half 320.

In an alternative example embodiment, the sequence of turning, flapping, folding or respectively Z-fold folding of the pelvis region 8, of the back-of-head section 31 and/or of the front-of-head section 32 can be interchanged.

Alternatively, it is also possible that the folding, flapping or turning of the back-of-head section 31 is omitted. In this case, only the pelvis region 8 is turned in as previously described, and the first half 320 of the front-of-head section 32 is turned in, flapped or folded, likewise as described.

Subsequently, the head region 3, which is turned, flapped, folded, or folded in a Z-fold in the back-of-head section 31 and/or in the front-of-head section 32, is rolled up in the direction of travel F and towards the vehicle side wall 26 to the upper roll 27 (see in this respect also FIG. 5*a*; 5*b*).

Thereafter, the turned-in pelvis region 8 together with the thorax region 6 is rolled up contrary to the direction of travel F and towards the occupant to the lower roll 28 (see in this respect also FIG. 5*a* or 5*b*). Here, the upper roll 27 is rolled over by the lower roll 28, so that the upper roll 27 in the compact state of the airbag 2 is no longer visible from the exterior.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An airbag device for a vehicle, the airbag device comprising:
    an airbag that, on an activation of the airbag device, is transferred from a compact state into an expanded state, wherein the airbag has a head region, a thorax region, and a pelvis region; and
    a gas generator for generation of gas;
    wherein, in the expanded state of the airbag, the head region is configured for protection of a head of an occupant situated on a vehicle seat, the thorax region is configured for protection of an upper body of the occupant, and the pelvis region is configured for protection of a pelvis of the occupant;
    wherein the airbag is configured as a single-chamber side airbag;
    wherein the airbag device has a diffuser with a first diffuser opening and a second diffuser opening, wherein the diffuser is configured to direct the gas, which is generated by the gas generator, as a first gas stream through the first diffuser opening into a first flow direction and as a second gas stream through the second diffuser opening into a second flow direction, wherein the first flow direction and the second flow direction differ from one another;
    wherein the head region has a back-of-head section and a front-of-head section, wherein the back-of-head section is configured for protection of a back of the head and the front-of-head section is configured for protection of a face of the occupant, when the airbag has the expanded state, wherein the back-of-head section and/or the front-of-head section is/are turned-in, flapped, folded and/or flapped in a Z-fold transversely to the second flow direction to assume the compact state of the airbag; and
    wherein the airbag in the compact state has an upper roll and a lower roll, wherein a turned-in, folded, flapped and/or Z-fold flapped back-of-head section and/or a turned-in, folded, flapped and/or Z-fold flapped front-of-head section is/are rolled up facing away from the occupant and form(s) the upper roll and wherein a turned-in pelvis region together with the thorax region is rolled up towards the occupant and forms the lower roll, wherein the upper roll is rolled over by the lower roll.

2. The airbag device according to claim 1, wherein the gas generator is arranged inside the airbag.

3. The airbag device according to claim 1, wherein firstly the lower roll and thereafter the upper roll unrolls on the occupant when the airbag expands.

4. The vehicle according to claim 1, wherein the first flow direction is directed to the pelvis region and the second flow direction is directed to the head region.

5. The vehicle according to claim 1, wherein the second diffuser opening has a greater opening area than the first diffuser opening and/or wherein the second gas stream has a greater volume flow than the first gas stream.

6. An airbag device for a vehicle, the airbag device comprising:
    an airbag that, on an activation of the airbag device, is transferred from a compact state into an expanded state, wherein the airbag has a head region, a thorax region, and a pelvis region; and
    a gas generator for generation of gas;
    wherein, in the expanded state of the airbag, the head region is configured for protection of a head of an occupant situated on a vehicle seat, the thorax region is configured for protection of an upper body of the occupant, and the pelvis region is configured for protection of a pelvis of the occupant;

wherein the airbag is configured as a single-chamber side airbag;

wherein the airbag device has a diffuser with a first diffuser opening and a second diffuser opening, wherein the diffuser is configured to direct the gas, which is generated by the gas generator, as a first gas stream through the first diffuser opening into a first flow direction and as a second gas stream through the second diffuser opening into a second flow direction, wherein the first flow direction and the second flow direction differ from one another;

wherein the airbag has a rebound strap which is arranged centrally in the head region and extends transversely to the second flow direction, wherein the rebound strap is configured as a sail to expand the head region more quickly and/or to divert the second gas stream into the back-of-head section and/or front-of-head section.

7. The airbag device according to claim 6, wherein the first flow direction is directed to the pelvis region and the second flow direction is directed to the head region.

8. The airbag device according to claim 6, wherein the second diffuser opening has a greater opening area than the first diffuser opening.

9. The airbag device according to claim 6, wherein the second gas stream has a greater volume flow than the first gas stream.

10. The airbag device according to claim 6, wherein, to assume the compact state of the airbag, the pelvis region is turned in contrary to the first flow direction.

11. The airbag device according to claim 6, wherein the head region has a back-of-head section and a front-of-head section, wherein the back-of-head section is configured for protection of a back of the head and the front-of-head section is configured for protection of a face of the occupant, when the airbag has the expanded state, wherein the back-of-head section and/or the front-of-head section is/are turned-in, flapped, folded and/or flapped in a Z-fold transversely to the second flow direction to assume the compact state of the airbag.

12. The airbag device according to claim 11, wherein a turned-in, folded, flapped and/or Z-fold flapped front-of-head section and/or a turned-in, folded, flapped and/or Z-fold flapped back-of-head section, to assume the compact state of the airbag, is/are turned in contrary to the second flow direction and form(s) a turned-in head region.

13. The airbag device according to claim 12, wherein the airbag in the compact state has a single roll, wherein the turned-in head region together with a turned-in pelvis region and the thorax region is rolled up towards the occupant to the single roll.

14. The method according to claim 6, wherein a back-of-head section and/or a front-of-head section is/are turned in, folded, flapped and/or flapped in a Z-fold transversely to the second flow direction and is/are rolled up contrary to the second flow direction to an upper roll or is/are turned in contrary to the second flow direction.

15. The vehicle according to claim 6, wherein the gas generator is arranged inside the airbag.

* * * * *